June 27, 1967    J. A. NAVA ETAL    3,328,573
EXPLOSION-PROOF JOINT
Filed Sept. 8, 1965
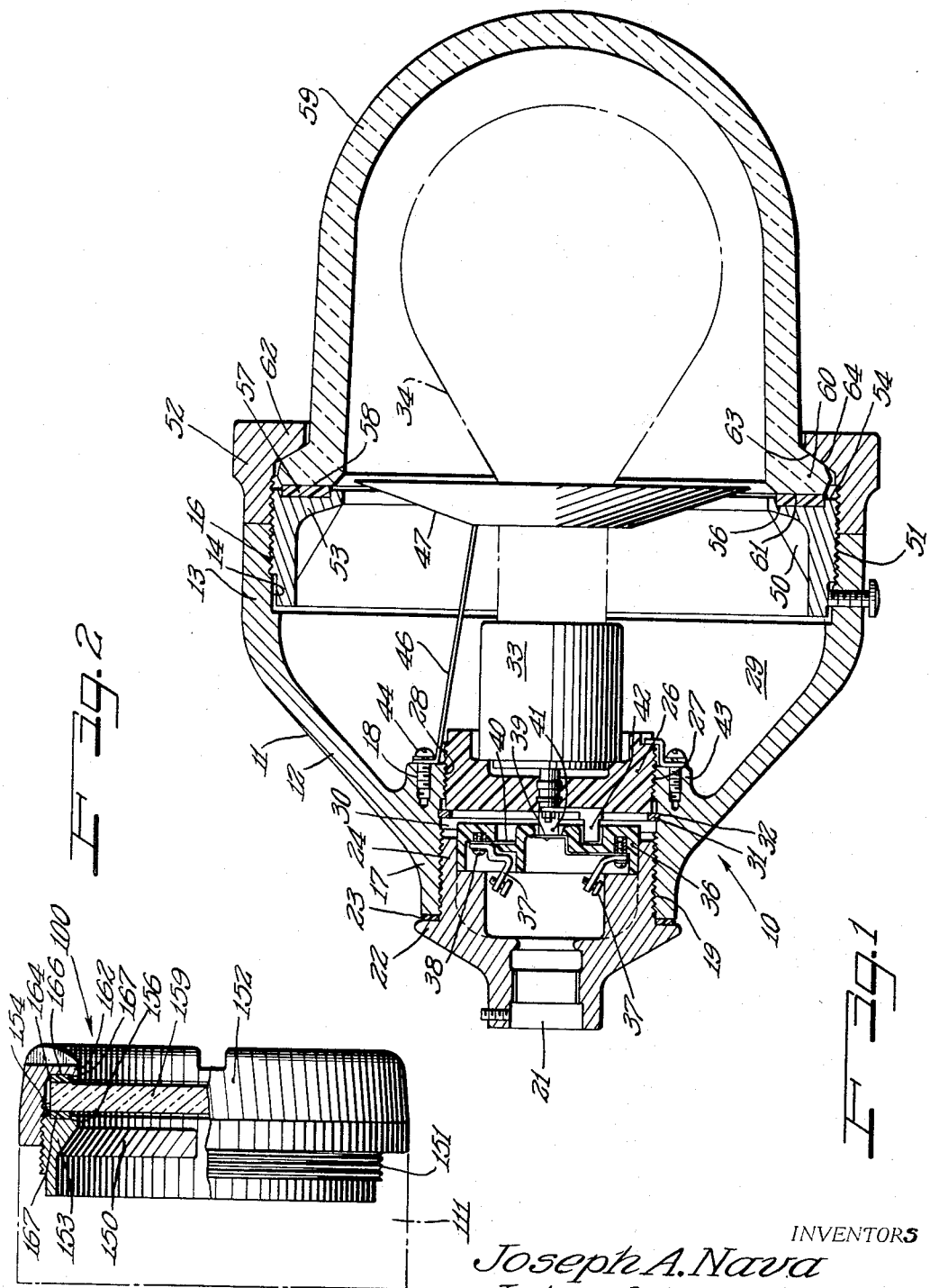
INVENTORS
Joseph A. Nava
John M. Tums
BY          ATTORNEYS ём
United States Patent Office 3,328,573
Patented June 27, 1967

3,328,573
EXPLOSION-PROOF JOINT
Joseph A. Nava, Villa Park, and John M. Tums, Oak Park, Ill., assignors to The Pyle-National Company, Chicago, Ill., a corporation of New Jersey
Filed Sept. 8, 1965, Ser. No. 485,899
11 Claims. (Cl. 240—11.2)

ABSTRACT OF THE DISCLOSURE

An explosion-proof fixture or enclosure wherein arcing occurs and wherein a resilient fluorocarbon plastic resin gasket is clamped tight to squeeze the resin gasket between confronting abutment surfaces thereby sealing any irregularities and out-of-flatness spots on the surfaces and forming a safe and reliable explosion-proof joint.

---

In the use of electrical apparatus in hazardous environments, such as floodlights or pendant lamps or electrical connectors, it is necessary to provide so-called explosion-proof joints, particularly between parts which are likely to transmit flaming gases between various compartments of the fitting or from the interior of the fitting to the hazardous environment. Heretofore, such explosion-proof joints have utilized complicated and expensive machined parts such as threaded joints or joints requiring the use of lead alloys clamped by special structural arrangements producing either a joint of special tightness or a path of sufficiently elongated length to cool-down the flaming gases below ignition temperature.

In accordance with the principles of the present invention, it is contemplated that a joint be explosion-proofed by the utilization of a gasket made of a plastic fluorocarbon resin such as polytetrafluoroethylene. The joint could be formed as a glass-to-metal, metal-to-metal or glass-to-glass joint. Under compression, such a gasket will flow and thus fill and seal any irregularities and out-of-flatness spots on the glass or metal surfaces. Moreover, the gasket exhibits resiliency superior to that of any metal gasket, thereby maintaining a tight joint even though the electrical unit is subjected to varying ambient and operating temperatures and accompanying expansion and contraction of the metal and glass members. The gasket also exhibits favorable recovery characteristics and is heat-resistant, thereby displaying a capability of withstanding severe environmental temperatures. It is contemplated by the present invention that such a gasket be located either in a groove formed in one of the parts and projecting beyond the surface for engagement with the adjoining surface or the gasket may simply be located between two flat surfaces. A simple clamping arrangement can then be provided to clamp the glass or the metal, or both, and the gasket into a safe and reliable explosion-proof joint.

It is an object of the present invention, therefore, to provide a new explosion-proof joint for enclosures to be utilized in hazardous locations.

It is a particular object of the present invention to provide an explosion-proof floodlight or an explosion-proof lighting fixture of the pendant-type wherein the glass-to-metal joints are provided with an improved explosion-proof construction.

Many other features, advantages and additional objects of the present invention will become manifest to those versed in the art upon making reference to the detailed description which follows and the accompanying sheet of drawings in which a preferred structural embodiment of an explosion-proof floodlight and an explosion-proof pendant light is shown, each of the exemplary lights embodying the principles of the present invention.

On the drawings:

FIGURE 1 is a cross-sectional view of a pendant-type light incorporating the explosion-proof joint of the present invention; and FIGURE 2 is an elevational view with parts broken away and with parts shown in phantom illustrating the application of an explosion-proof joint to an explosion-proof floodlight in accordance with the principles of the present invention.

As shown on the drawings:

It will be understood that the principles of the present invention are applicable to any enclosure, electrical connector, or lighting fixture adapted to be utilized in a hazardous location and wherein it is necessary to provide an explosion-proof joint in a so-called glass-to-metal, glass-to-glass, or metal-to-metal relationship. To exemplify and illustrate the principles of the present invention in a typical commercial application, therefore, there is disclosed herein a pendant-type light shown generally in FIGURE 1 at 10 and an explosion-proof floodlight shown generally at 100.

Referring, first of all, to the pendant-type light 10, as illustrated in FIGURE 1, it will be noted there is provided a bell-shaped housing 11 having an outwardly diverging body portion 12 terminating at its widest part in an axially extending ring portion 13 and in the ring portion 13, there is formed a bore 14 which is partially threaded internally as at 16.

The other end of the body portion 12 terminates in an axially extending neck of reduced size shown at 17 and the neck is provided with considerable axial extent by virtue of an internal boss shown at 18. The neck 17 is internally threaded as at 19 and receives in threaded relationship therewith a cap member 20 provided with a suitable coupling portion 21 by means of which the pendant light 10 may be suspended from a support.

The cap 20 has a radially outwardly extending flange 22 which overlies the end of the bell-shaped housing 11 and a gasket 23 is interposed therebetween for sealing purposes. The cap 20 further includes an externally threaded coupling portion 24 which is screw-threaded into the neck 17 and there are a sufficient number of screw threads provided to form an elongated explosion-proof path, i.e., a path of sufficient length to cool any flaming gases below ignition temperature.

Threaded into the interior boss portion 18 of the neck 17 is a socket mounting member 26 which is generally cylindrical in configuration and is externally threaded as at 27 in order to provide a screw-threaded coupling relationship with the internally threaded portion 28 of the boss 18 and the socket mounting member 26 partitions the interior of the bell-shaped housing 11 into a lamp compartment 29 and a wiring compartment 30.

A snap ring 31 is seated within a circumferentially extending groove 32 formed between the threaded portion 28 and the threaded portion 19 of the neck 17 and its associated boss 18, thereby to provide a bottom stop against which the mounting member 26 engages when it is fully screwed into attachment with the bell-shaped housing 11.

A lamp socket 33 is connected in firm assembly to the mounting member 26 and projects into the lamp compartment 29. An incandescent light bulb 34 is carried by the lamp socket 33.

The cap member 20 carries a terminal block 36 and the terminal block is provided with terminal connectors 37 which, in turn, are connected by means of fasteners 38 to concentrically disposed slip rings including a center contact 39 and an outer contact 40.

The mounting member 26 is provided with cooperating electrical terminals including a center post terminal 41 which engages the center contact 39 and an outer contact 42 which engages the ring 40. Thus, when either the mounting member 26 or the cap 20 is threadedly separated from the boss 18 or the neck 17, electrical contact will be broken before a sufficient number of threads in the joint between the neck 17 and the pilot portion 24 or between the boss 18 and the mounting member 26 are separated.

The boss 18 is also provided with a plurality of threaded apertures 43 for receiving fasteners 44 attaching in firm assembly the support legs 46 which carry a reflector 47. The reflector 47 is positioned inwardly of the flange 13 and operates to reflect rays of light from the incandescent light bulb 34 outwardly of the housing.

A clamping ring is shown at 50 and has an externally threaded portion 51 which is threaded into the threads 16 of the axially extending portion 13 on the bell-shaped housing. The threaded portion 51 is of sufficient length so that it can be securely fastened in the bell-shaped housing 11 and a portion thereof projects outwardly beyond the end of the bell-shaped housing 11, thereby to receive in assembly therewith a retainer ring 52.

The clamping ring 50 is particularly characterized by a radially inwardly extending flange 53 which forms a flat radial surface 54 which is circumferentially continuous. In the illustrated form of the invention the surface 54 is particularly characterized by the formation of an annular groove 56 spaced inwardly of the inner and outer edges of the surface 54. Inserted within the groove 56 is a gasket 57 provided in accordance with the principles of the present invention. The gasket 57 more than completely fills the groove 56 in that the gasket 57 projects outwardly beyond the surface 54, thereby to present a flat abutment surface shown at 58.

A glass globe 59 closes the lamp compartment 29 and is particularly characterized by a radially outwardly extending circumferentially continuous flange 60 having formed on the end thereof an abutment surface 61 which is co-extensive in configuration with the surface 58 of the gasket 57. Thus, the surface 61 of the glass globe 59 engages the surface 58 of the gasket 57.

It is contemplated by the present invention that the gasket 57 be made of a plastic fluorocarbon resin. Fluorocarbon resins are classed as thermoset-plastics, and are chemically analogous to the polyolefins, but with some or all of the hydrogen atoms replaced by fluorine atoms.

Fluorine substitution generally contributes to: (1) chemical inertness; (2) resistance to high and low temperatures; (3) essentially zero moisture absorption; (4) low co-efficient of friction; (5) non-flammability; and (6) weather and oxidation resistance.

It is recognized that at least four classes of fluorocarbon resin are now commercially available. For example, polytetrafluoroethylene whose basic unit consists of two carbons with fluorine fully substituting for hydrogen represents one class of fluorocarbon resin which is supplied by E. I. du Pont de Nemours & Co., Inc. under the trade name "Teflon" and by Allied Chemical Corporation under the trade name "Halon."

Fluorinated ethylene propylene, a copolymer of polytetrafluoroethylene and hexafluoropropylene, is also supplied by E. I. du Pont de Nemours & Co., Inc. under the trade name "Teflon FEP."

Chlorotrifluoroethylene is another resin which, in a strict sense, might be referred to as a chlorofluorocarbon, however, typical of a material in this class is that supplied by Minnesota Mining & Mfg. Co. under the trade name "KEL–F 81." Copolymers of that type modified with small amounts of vinylidene fluoride and other fluorine containing monomers to improve processability are also available. Such resins include the trade name "Plaskon" as well as "KEL–F 82" supplied by Minnesota Mining & Mfg. Co.

Lastly, polyvinylidene fluoride is another resin supplied by Pennsalt Chemical Corp. under the trade name "Kynar."

The retainer ring 52 has a radially inwardly extending flange 62 formed with a circumferentially continuous abutment surface 63 which overlies an adjoining abutment surface 64 on the flange 60 of the glass globe 59. Thus, when the retainer ring 52 is threaded into assembly with the clamping ring 50, the glass globe 59 will be securely clamped and the surface 61 of the flange 60 will engage the surface 58 of the gasket 57 so that the gasket 57 will be tightly bottomed in the groove or recess 56 and the clamping will produce a tight explosion-proof joint.

In FIGURE 2, the explosion-proof floodlight 100 is shown as including a main body portion depicted in phantom lines and identified at 111. A clamping ring is shown at 150 and has a radially inwardly extending flange 153, as well as an externally threaded portion 151. The flange 153 forms a flat radially inwardly extending surface 154 which is circumferentially continuous and which is characterized by an annular groove or recess 156 formed inwardly of the inner and outer edges of the surface 154.

The retainer ring in this form of the invention is shown at 152 and is likewise characterized by the provision of a radially inwardly extending flange 162 forming a flat radial circumferentially continuous surface 164 which is characterized by the formation therein of an annular groove 166 spaced inwardly of the inner and outer edges of the surface 164.

Both of the grooves 156 and 166 are completely filled with gaskets shown at 167 and both gaskets project outwardly beyond their respective adjoining surfaces 154 and 164. A glass lens is shown at 159 and is clamped between the two gaskets 167, 167 to form an explosion-proof joint. The gaskets 167, of course, are made of the same plastic fluorocarbon resin material as is referred to above.

By using a plastic fluorocarbon resin such as "Teflon," better sealing properties are obtained than with the use of a metal gasket as has been heretofore utilized in some lighting fixtures. Under the compression imposed by the retainer ring 52 or 152, the "Teflon" gaskets will flow and thus fill and seal any irregularities and out-of-flatness spots on the glass or metal surfaces.

Moreover, the plastic fluorocarbon resins exhibit resiliency superior to that of any metal gasket and such resilient properties are helpful in maintaining a tight joint when the unit is subjected to varying ambient and operating temperatures and accompanying expansion and contraction of the metal and glass members. Further, metal gaskets do not exhibit the recovery characteristics of the plastic fluorocarbon resins.

As applied to explosion-proof lights, the fluorocarbon plastic resins also display improved heat resistance and the gaskets in the glass-to-metal joints can withstand more severe environment temperatures and still remain functional. Moreover, the plastic gaskets provided in accordance with the principles of the present invention are unaffected by various solvents, acids and alkalis, are not subject to aging, and provide a durability and useful life that is actually comparable to that of metals.

In prior art fixtures heretofore provided, explosion-proof joints in a metal-to-glass relationship have frequently used linotype lead alloy. Those versed in the art will recognize that such alloys melt at a temperature lower than the temperature allowed for such equipment by the standards of Underwriters' Laboratories. Accordingly, such a condition creates a circumstance wherein high temperatures will cause a catastrophic melting of the alloy, thereby completely destroying the explosion-proof characteristics of the joint.

The plastic gaskets provided in accordance with the principles of the present invention, on the other hand, resist temperatures well in excess of the standards and requirements of Underwriters' Laboratories and will not melt or fail in the manner of lead alloy joints.

The gaskets 57 or 167 may be employed as manufactured with the finish being the natural finish as supplied in plastic form or, the gaskets 57 and 167 may be of the type which are metal-clad or metal-coated. The metal coating, when it is of a soft material such as aluminum, cadmium or tin, in suitably thin finish, provides the additional advantage of cold metallurgical adhesion between the gasket and the metal interfaces of the electrical equipment, thereby increasing the gas healing characteristics of the joint.

Although various minor modifications might be suggested by those versed in the art, it should be understood that we wish to embody within the scope of the patent warranted hereon all such modifications as reasonably and properly come within the scope of our contribution to the art.

We claim as our invention:

1. An explosion-proof lamp fixture comprising
   a body member made of metal having an electrical mounting means therein for an electrical light source which constitutes a flame propagating hazard,
   a glass member for assembly therewith through which rays of light may be projected,
   and a retainer holding said members in firm assembly with one another,
      said members having an abutment joint formed therebetween including a groove extending throughout the extent of said joint and formed in said metal member and a confronting flat surface on said glass member,
   and a gasket in said groove having a portion projecting out of said groove into engagement with said flat surface,
      said gasket being made of a resilient fluorocarbon resin material consisting of polytetrafluoroethylene and together with said abutment joint at said groove and flat surface forming an explosion-proof seal between the metal and the glass members, whereby said abutment joint forms an explosion-proof joint isolating the hazard from the surrounding environment.

2. An explosion-proof lamp fixture as defined in claim 1 wherein said glass member comprises a flat lens of a floodlight.

3. An explosion-proof lamp fixture as defined in claim 1 wherein said glass member comprises a flanged globe of a pendant-type lighting fixture.

4. An explosion-proof floodlight comprising,
   a floodlight body having electrical light source means therein constituting a flame propagating hazard in an explosive environment and having means forming a circumferentially extending continuous shoulder,
   a glass lens on said shoulder,
   a retaining ring connected to said body and including a circumferentially extending continuous shoulder overlying said glass lens for clamping the edges of said glass lens between said two shoulders,
      each of said shoulders having a continuous groove formed therein,
   and a gasket in each said groove having a first surface bottomed in said groove and a second surface engaging said glass lens,
      said gasket being made of a fluorocarbon resin material selected from the class consisting of polytetrafluoroethylene, fluorinated ethylene propylene chlorotrifluoroethylene, and polyvinylidene,
thereby to be resilient and flowable for sealing any irregularities and out-of-flatness spots on the glass or metal surfaces, said shoulder and said glass lens together with said gasket forming an explosion-proof joint isolating said hazard from the environment surrounding said body.

5. An explosion-proof lamp comprising
   a bell-shaped housing having
      an internally threaded bore portion at its widest point,
      and an internally threaded neck at its narrowest point,
   a socket mounting member threaded into said neck and partitioning the interior of said housing into a wiring chamber and a lamp chamber,
   a lamp socket on said mounting member in said lamp chamber,
   a cap member threaded into said neck and having a wiring terminal block,
      slip ring terminals between said mounting member and said terminal block,
   a clamping ring having an externally threaded portion threaded into said threaded bore portion,
      said clamping ring having a radially inwardly extending circumferentially continuous shoulder formed wtih an annular groove inwardly of the inner and outer edges of said shoulder,
   a gasket made of resilient fluorocarbon plastic resin completely filling said groove and projecting outwardly of said groove beyond the surface of said flange,
   a glass globe for closing said lamp compartment and having a flange presenting a flat surface coextensive in size and configuration to the projecting face of said gasket,
   and a retaining ring threaded onto said clamping ring and having a flange overlying said globe flange to clamp the glass, gasket and clamping ring into an explosion-proof joint.

6. An explosion-proof floodlight comprising,
   a lamp body having an internally threaded bore in which is mounted an electrically energized light source constituting a potential flame propagating hazard,
   a clamping ring having an externally threaded portion threaded into said bore and projecting outwardly thereof,
      said clamping ring having a flange projecting radially inwardly and forming a circumferentially continuous flat radial surface having a groove spaced inwardly of the inner and outer edges of said surface,
   a gasket made of resilient plastic fluorocarbon resin material completely filling said groove and projecting outwardly beyond said flat surface,
   a glass lens seated on said gasket,
   a retainer ring threaded onto said clamping ring and having a flange projecting radially inwardly and forming a circumferentially continuous flat radial surface formed with a groove spaced inwardly of the inner and outer edges of said surface,
   a gasket made of resilient plastic fluorocarbon resin material completely filling said groove and projecting outwardly beyond the flat surface and engaging said glass lens,
      said retainer ring clamping said gaskets and said glass lens and the adjoining ring surfaces into explosion-proof relation, thereby to form an explosion-proof joint isolating said hazard from the environment surrounding the body.

7. An explosion-proof lamp fixture as defined in claim 1, said gasket having a metal coating to provide cold metallurgical adhesion between the gasket and the metal interfaces.

8. An explosion-proof enclosure in which arcing occurs comprising
   a body assembly including separable parts for assembly with one another and having an arcing source therein presenting a potential hazard in a hazardous environment,
   and a retainer means holding said parts in firm assembly with one another,
      said parts having an abutment joint formed therebetween including opposed confronting flat surfaces, and a gasket in said joint having opposed surfaces in engagement with each of said flat surfaces, said gasket being made of a resilient fluorocarbon resin material consisting of polytetrafluoroethylene and together with said opposed confronting surfaces at said joint forming an explosion-proof seal for the enclosure isolating the arcing source from the hazardous environment.

9. An explosion-proof enclosure as defined in claim 8 and further characterized by said abutment joint having formed in one of said confronting flat surfaces a groove extending lengthwise of said joint for receiving said gasket.

10. An explosion-proof enclosure as defined in claim 8 and further characterized by said separable parts comprising one made of metal and the other being made of glass thereby to form a glass-to-metal joint.

11. An explosion-proof enclosure as defined in claim 10 and further characterized by said metal part having a groove formed therein at said confronting flat surfaces of said abutment joint for receiving said gasket.

References Cited
UNITED STATES PATENTS

| | | | |
|---|---|---|---|
| 2,553,222 | 5/1951 | Wallgren et al. | 123—193 |
| 2,617,554 | 11/1952 | Smith | 220—46 |
| 2,767,768 | 10/1956 | Jelinck | 154—33.1 |
| 2,774,621 | 12/1956 | Kilborne | 288—33 |
| 2,786,936 | 3/1957 | Appleton | 240—11.2 |
| 2,837,360 | 6/1958 | Ladd | 288—24 |
| 2,872,341 | 2/1959 | Stein | 117—47 |
| 2,876,340 | 3/1959 | Williams | 240—41.55 |
| 2,892,650 | 6/1959 | Runton | 288—33 |
| 3,180,980 | 4/1965 | Morrison | 240—11.2 |
| 3,219,811 | 11/1965 | Young | 240—26 |

NORTON ANSHER, *Primary Examiner.*

W. M. FRYE, *Assistant Examiner.*